US006738368B1

(12) United States Patent
Terry

(10) Patent No.: US 6,738,368 B1
(45) Date of Patent: May 18, 2004

(54) PRIORITIZATION AND FLOW CONTROL OF A SPREAD SPECTRUM MULTIUSER CHANNEL

(75) Inventor: Stephen E. Terry, North Port, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 09/569,731

(22) Filed: May 12, 2000

(51) Int. Cl.[7] .............................................. H04L 12/28
(52) U.S. Cl. ...................................... 370/342; 370/229
(58) Field of Search ................................. 370/229, 235, 370/237, 395.21, 395.42, 395.43, 412, 416, 418

(56) References Cited

U.S. PATENT DOCUMENTS

| | | | | |
|---|---|---|---|---|
| 4,630,261 A | * | 12/1986 | Irvin | 370/235 |
| 5,278,828 A | * | 1/1994 | Chao | 370/394 |
| 5,317,562 A | | 5/1994 | Nardin et al. | |
| 5,666,348 A | * | 9/1997 | Thornberg et al. | 370/230 |
| 5,729,540 A | * | 3/1998 | Wegrzyn | 370/336 |
| 5,742,588 A | * | 4/1998 | Thornberg et al. | 370/236 |
| 5,802,310 A | | 9/1998 | Rajaraman | |
| 5,838,677 A | * | 11/1998 | Kozaki et al. | 370/389 |
| 6,091,725 A | * | 7/2000 | Cheriton et al. | 370/392 |
| 6,105,070 A | * | 8/2000 | Gaylord | 709/232 |
| 6,122,253 A | * | 9/2000 | Jones | 370/235 |
| 6,330,603 B1 | | 12/2001 | Seki et al. | |
| 6,421,335 B1 | * | 7/2002 | Kilkki et al. | 370/342 |
| 6,424,624 B1 | * | 7/2002 | Galand et al. | 370/231 |
| 6,496,513 B1 | * | 12/2002 | Takamichi | 370/434 |

FOREIGN PATENT DOCUMENTS

| | | | | |
|---|---|---|---|---|
| EP | 430570 A2 | * | 6/1991 | H04L/12/56 |
| EP | 877512 A2 | * | 11/1998 | H04L/12/56 |
| EP | 0912015 A2 | | 4/1999 | |
| EP | 0912015 A3 | | 5/1999 | |
| EP | 0977393 A1 | | 2/2000 | |
| JP | H345051 | | 2/1991 | |
| WO | WO9608935 | | 3/1996 | |
| WO | WO9833349 | | 7/1998 | |
| WO | WO9847253 | | 10/1998 | |
| WO | WO9909775 | | 2/1999 | |

OTHER PUBLICATIONS

Chao, H.J. et al. "Queue Management with Multiple Delay and Loss Priorities for ATM Switches". IEEE International Conferenc on Communications, 1994. ICC 94, SUPERCOMM. New Orleans, LA. May 1–5, 1994. vol. 2. pp. 1184–1189.*

Liebeherr, J. et al. "Priority Queue Schedulers with Approximate Sorting in Output–Buffered Switches". IEEE Journal on Selecte Areas in Communications. Charlottesville, VA. Jun. 1999. vol. 17. iss. 6. pp. 1127–1144.*

Chi–Qing Yang and Alapati V. S. Reddy, "A Taxonomy for Congestion Control Algorithms in Packet Switching Networks", IEEE Network, Jul./Aug. 1995, pp. 34–45.

TS 25.321 V2.0.1 MAC Protocol Specification, TSG–RAN Working Group 2 (Radio Layer 2 and Radio Layer 3), Berlin, Germany, May 25–28, 1999.

Stephen E. Terry, FACH Scheduling, Prioritization and Queue Management, 3GPP TSG–RAN WG2 #4, Berlin, Germany, May 25–28, 1999.

* cited by examiner

Primary Examiner—Hassan Kizou
Assistant Examiner—Donald L Mills
(74) Attorney, Agent, or Firm—Volpe and Koenig, P.C.

(57) ABSTRACT

Packet data from a plurality of sources is received at a controller associated with the multiuser channel. Each packet of the packet data is prioritized based on in part the reroutability of a class of data types. Each packet is scheduled for transmission over the multiuser channel based on in part the prioritization. A backlog of packet data queued is tracked for transfer over the multiuser channel. Based on in part the tracked queue, the flow of data from each data source is limited.

11 Claims, 7 Drawing Sheets

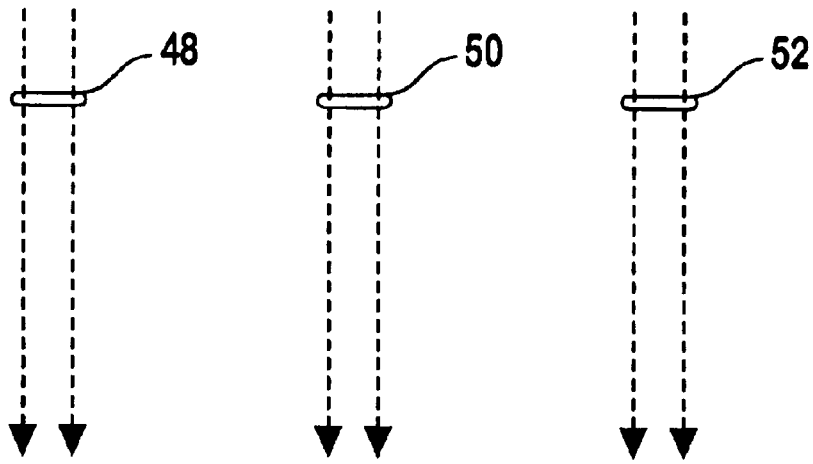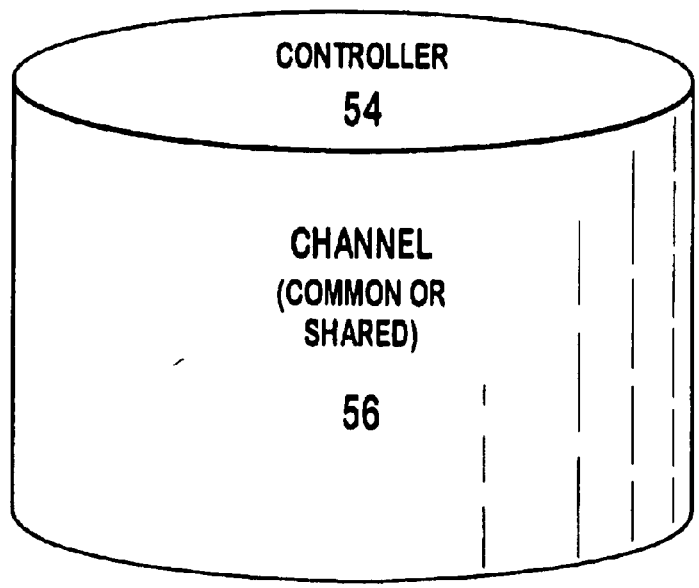
FIG. 2

FACH Prioritization 72

| Type | Source | Destination | | Class | Suggested Priority |
|---|---|---|---|---|---|
| | | No Iur | Across Iur | | |
| CCCH (Signaling) | RLC | X | X | Mandatory | Medium |
| DCCH (Signaling) | MAC-d | X | X | Best Effort | Medium |
| DTCH (Traffic) | MAC-d | X | X | Best Effort | Low |
| DSCH (Control) | MAC-sh | X | | Mandatory | Highest |
| USCH (Control) | MAC-sh | X | | Mandatory | Highest |
| H-ARQ (Control) | MAC-d | X | X | Mandatory | High |
| H-ARQ (Control) | MAC-sh | X | | Mandatory | Highest |

FIG. 5

PRIORITIZATION AND FLOW CONTROL OF A SPREAD SPECTRUM MULTIUSER CHANNEL

BACKGROUND

The invention generally relates to channels used by multiple users in a wireless code division multiple access spread spectrum system. More specifically, the invention relates to a system and method of prioritizing and controlling the flow of data for common and shared channels in a spread spectrum system.

FIG. 1 illustrates a simplified wireless spread spectrum code division multiple access (CDMA) communication system 18. A node b 26 within the system 18 communicates with associated user equipment 20–24 (UE). The node b 26 has a single site controller (SC) 30 associated with either a single (shown in FIG. 1) or multiple base stations 28. A Group of node bs 26,32,34 is connected to a radio network controller (RNC) 36. To transfer communications between RNCs 36–40, an interface between the RNCs (IUR) 42 is utilized. Each RNC 36–40 is connected to a mobile switching center (MSC) 44 which in turn is connected to the core network 46.

To communicate within the system 18, many types of communication channels are used, such as dedicated, shared and common. Dedicated channels transfer data between a node b 26 and a particular UE 20–24. Common and shared channels are used by multiple UEs 20–24 or users. All of these channels carry a variety of data including traffic, control and signaling data.

Since shared and common channels carry data for different users, data is sent using protocol data units (PDUs) or packets. As shown in FIG. 2, to regulate the flow of data from differing sources 48–52 into a channel 56, a controller 54 is used.

One common channel used for transmitting data to the UEs 20–24 is the forward access common channel (FACH) 58. As shown in FIG. 3, the FACH 58 originates in a RNC 36 and is sent to a node b 28–34 for wireless transmission as a spread sprectrum signal to the UEs 20–24. The FACH 58 carriers several data types from various sources, such as a common control channel (CCCH), dedicated control and traffic channel (DCCH and DTCH), and a downlink and uplink share channel (DSCH and USCH) control signaling. The FACH 58 also carries control signaling out of band, such as hybrid automatic repeat request (H-ARQ), and similar data transmitted via the IUR 62 from other RNCs 38–40, such as CCCH, DCCH, DTCH and H-ARQ control data.

Various controllers are used by the RNC 36 to control the flow of data. A radio link controller (RLC) 64 handles the CCCH. The dedicated medium access controller (MAC-d) 66 handles the DCCH, the DTCH and some out of band H-ARQ control signaling. The shared medium access controller (MAC-sh) 68 handles the DSCH, USCH control signaling and out of band H-ARQ control signaling. Controlling the FACH 58 is the common medium access controller (MAC-c) 60.

Due to the multiple sources of data 48–52 that can be transmitted over a common or shared channel, the channel controllers 54 queue the data prior to transmission. If a large backlog develops in the queue, data in the queue develops a latency. A large latency of certain data such as control data will result in the failure of a channel. To alleviate this problem, the prior art either flushed the queue to reduce congestion or rerouted the data. Flushing the queue results in the loss of data and requires retransmission which is undesirable. Rerouting data already queued creates a duplication of data within the system and does not resolve the existing congestion. According, it is desirable to reduce the latency of data for shared and common channels without the problems associated with the prior art.

SUMMARY

Packet data from a plurality of sources is received at a controller associated with the multiuser channel. Each packet of the packet data is prioritized based on in part the reroutability of a class of data types. Each packet is scheduled for transmission over the multiuser channel based on in part the prioritization. A backlog of packet data queued is tracked for transfer over the multiuser channel. Based on in part the tracked queue, the flow of data from each data source is limited.

BRIEF DESCRIPTION OF THE DRAWINGS

FIG. 2 is an illustration of data flowing into a common or shared channel.

FIG. 5 is a prioritization scheme for use with a FACH channel.

DETAILED DESCRIPTION OF THE PREFERRED EMBODIMENTS

Figure 4:
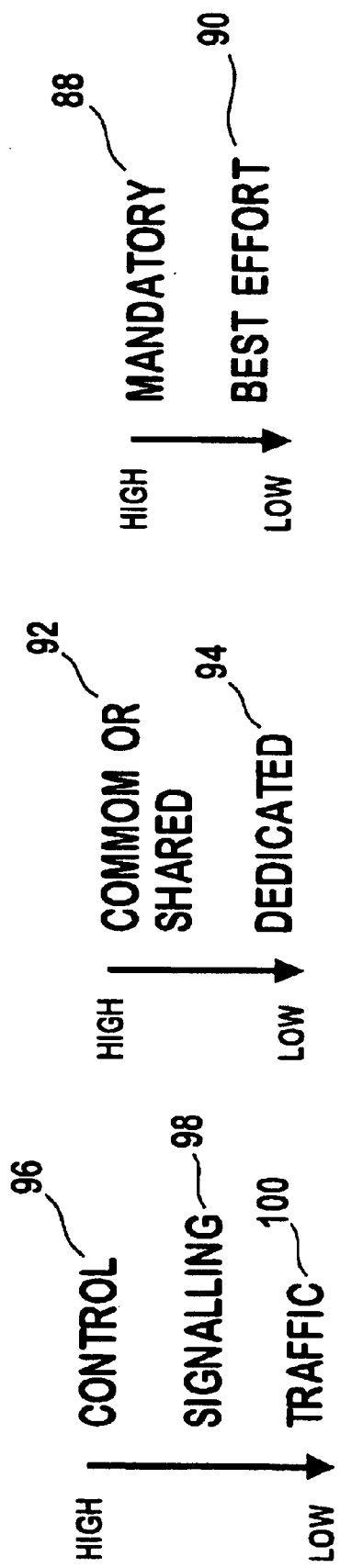
FIG. 4 is an illustration of a prioritization scheme.

Data prioritization 70 is used to reduce data latency in a multiuser channel controller 54 as illustrated in FIG. 4. For a particular common or shared channel, certain data must be transmitted on that channel and is shown in the figure as "mandatory" 88. Other data is preferably sent on the particular channel but may be rerouted to another channel, such as a dedicated channel. This data is referred to as "best effort" 90. Since "mandatory" data 88 is not reroutable, it takes priority over "best effort" data 90.

The type of the data within a packet, such as control 96, signaling 98 and traffic data 100, is also used for prioritization. To accomplish prioritization of the data type, control 96 and signaling 98 data packets are separated from traffic data packets 100. One approach to separating the packets is to group similar data type packets together prior to reception at the controller 54. Alternately, packets sent by each channel prior to reception by the controller 54 are provided with a flag or identifier indicating the packets' data type.

Since a prolonged delay in the transfer of control 96 or signaling 98 data results in a frozen channel, control 96 and signaling 98 data are given a higher priority than traffic data 100. Additionally, data associated with multiple users, common or shared 92, has a higher priority than data for a single user, dedicated 94. The data prioritization scheme is typically stored in the software of the multiuser channel's controller.

During periods of high congestion, data is rerouted to other channels based on its priority 70. For instance, best effort dedicated traffic data is rerouted and mandatory common control data is not. By rerouting data prior to queuing, retransmissions will not be required. Accordingly, the amount of queued data is reduced resulting in lower data latency. Additionally, since the rerouted data is never queued, the duplication of data as experienced in the prior art is eliminated.

A prioritization scheme 72 for use with a FACH 58 is shown in FIG. 5. Since the DSCH, H-ARQ of the MAC-sh have mandatory shared control data, they have the highest priority, highest. Although the H-ARQ of the MAC-d has mandatory control data, being dedicated it is assigned a slightly lower priority, high. The CCCH and DCCH are used for signaling and have the next level of priority, medium. The lowest level of priority is assigned to the DTCH because it has best effort dedicated traffic data.

Figure 1:
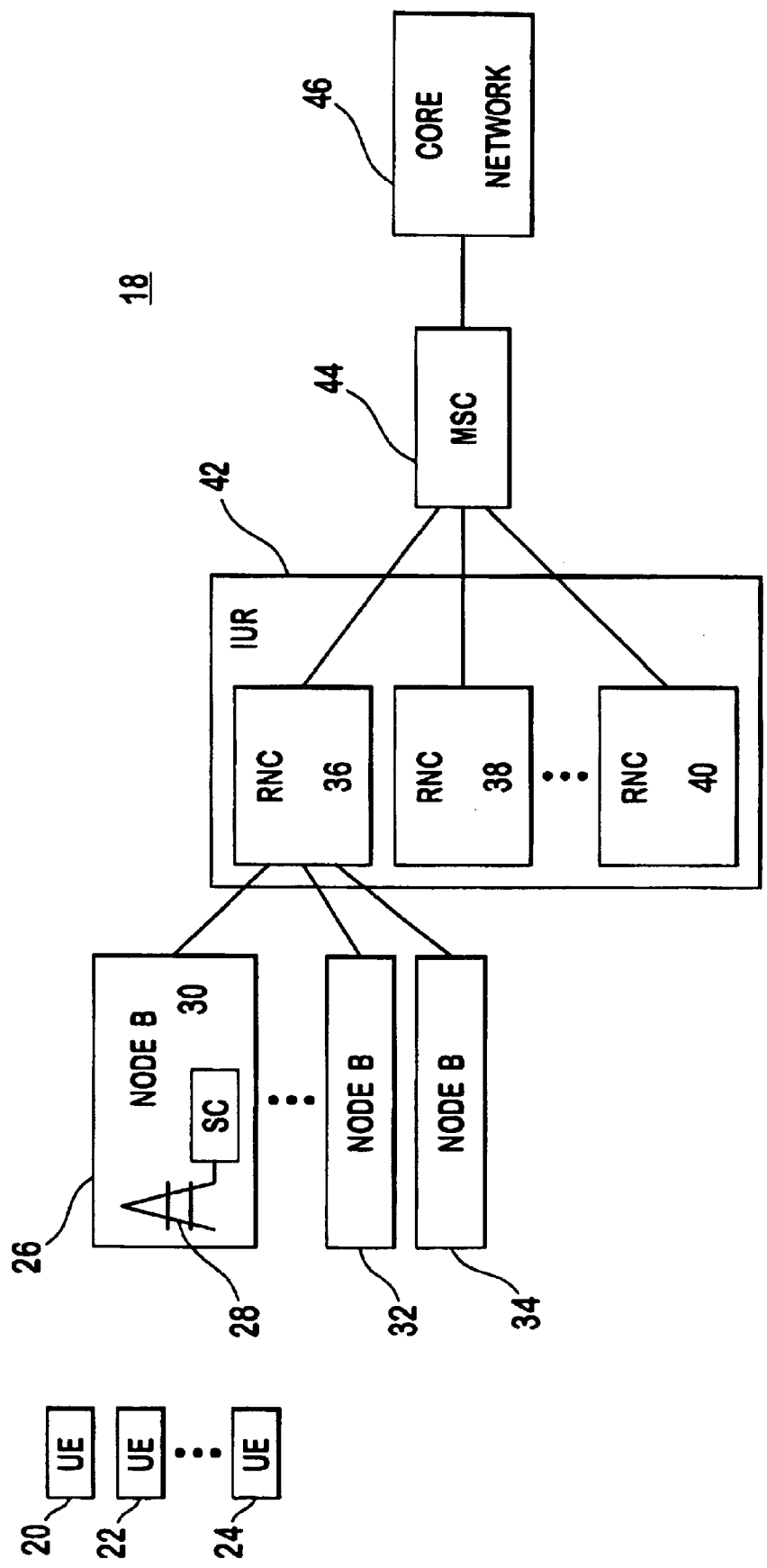
FIG. 1 is a simplified illustration of a wireless spread spectrum communication system.
Figure 3:
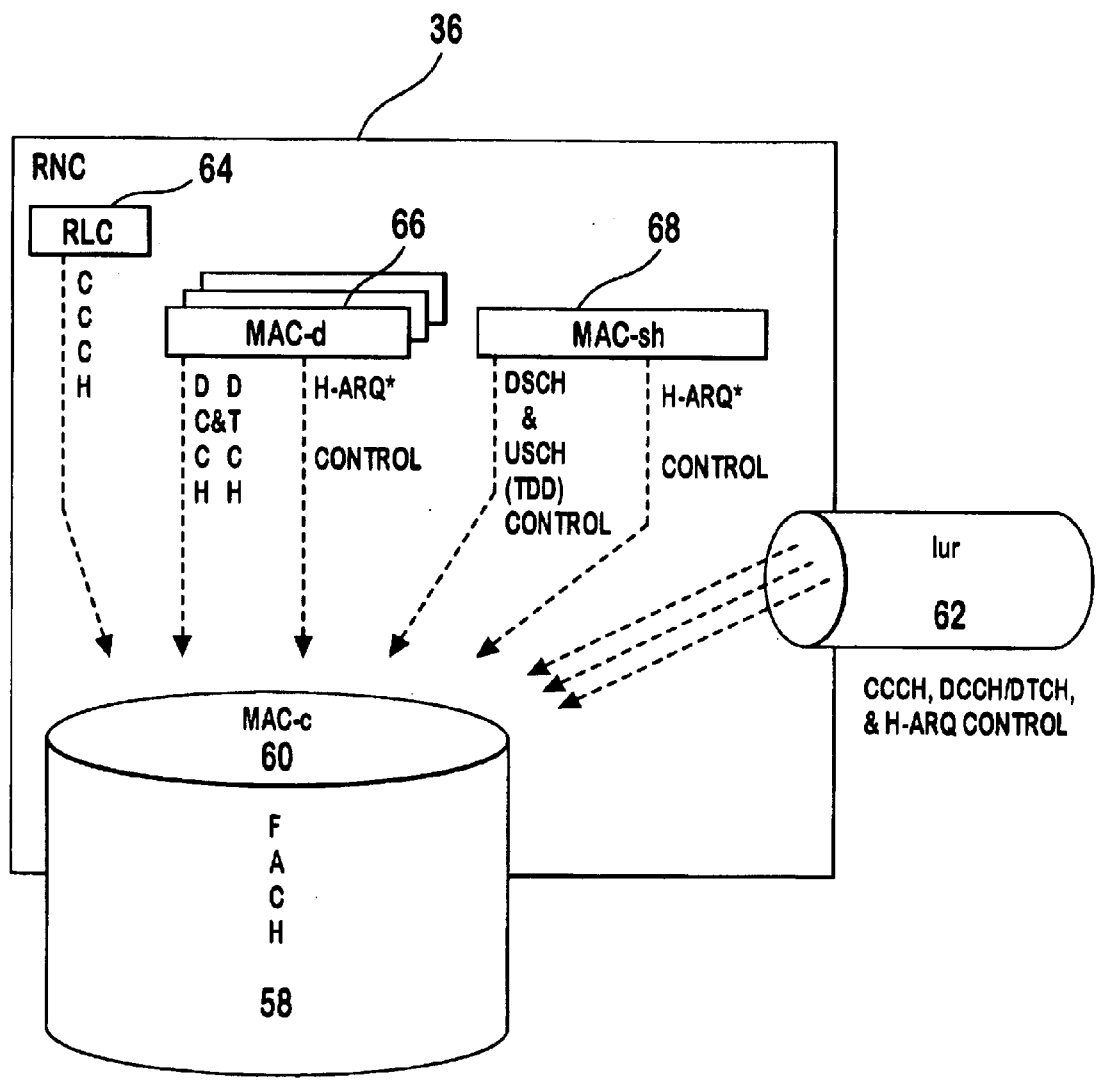
FIG. 3 is an illustration of data flowing into a FACH channel within a RNC.

To facilitate this prioritization scheme 72 for the FACH 58, modifications to the RNC 36 are required. As shown in FIG. 3, the prior art MAC-d 66 controls the DCCH, DTCH and MAC-d's H-ARQ. As shown in FIG. 5, each of these sources has a different priority. Since this data is multiplexed prior to prioritization at the MAC-d 66, the multiplexer of the MAC-d 66 is moved to the MAC-c 60 to allow prioritization at the MAC-c 60. Alternatively, the MAC-d 66 may send the priority and class (mandatory or best effort), such as by a flag or identifier, of each packet of the multiplexed data for prioritization at the MAC-c 60. The data controlled by the RLC 64 and the MAC-sh 68 have equal priority and accordingly, neither requires modification. Using the stored priority list, the data from the various sources is scheduled for transmission and rerouted during periods of high congestion.

Figure 6:
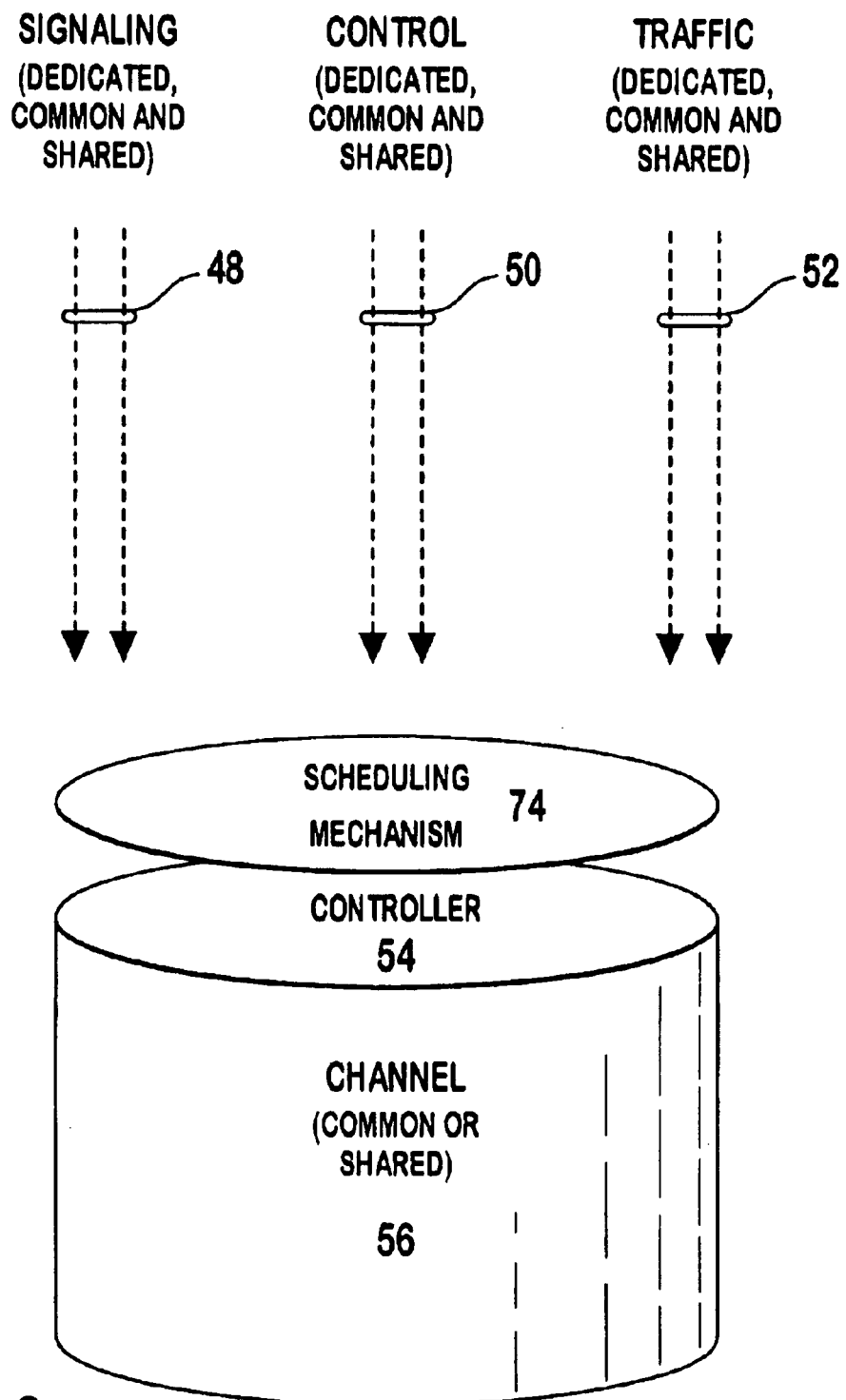
FIG. 6 depicts a reservation mechanism used with a common or shared channel.

Another technique for reducing the latency of data which may be combined with prioritization is to control the flow of data between the various controllers. As shown in FIG. 6, a scheduling mechanism 74 is used to regulate the data entering the common or shared channel 56. The scheduling mechanism 74 tracks the backlog of data in the controller's queue. If the mechanism 74 recognizes congestion and that the data will not be transmitted in a certain period of time, access to the channel 56 limits the flow of data from the individual data sources. The individual sources will recognize the need to reroute data or to not attempt transmission. Using a flow control mechanism with a FACH, MAC and RLC (Layer 2), the latency of signaling is decreased thus increasing efficiency.

Figure 7:
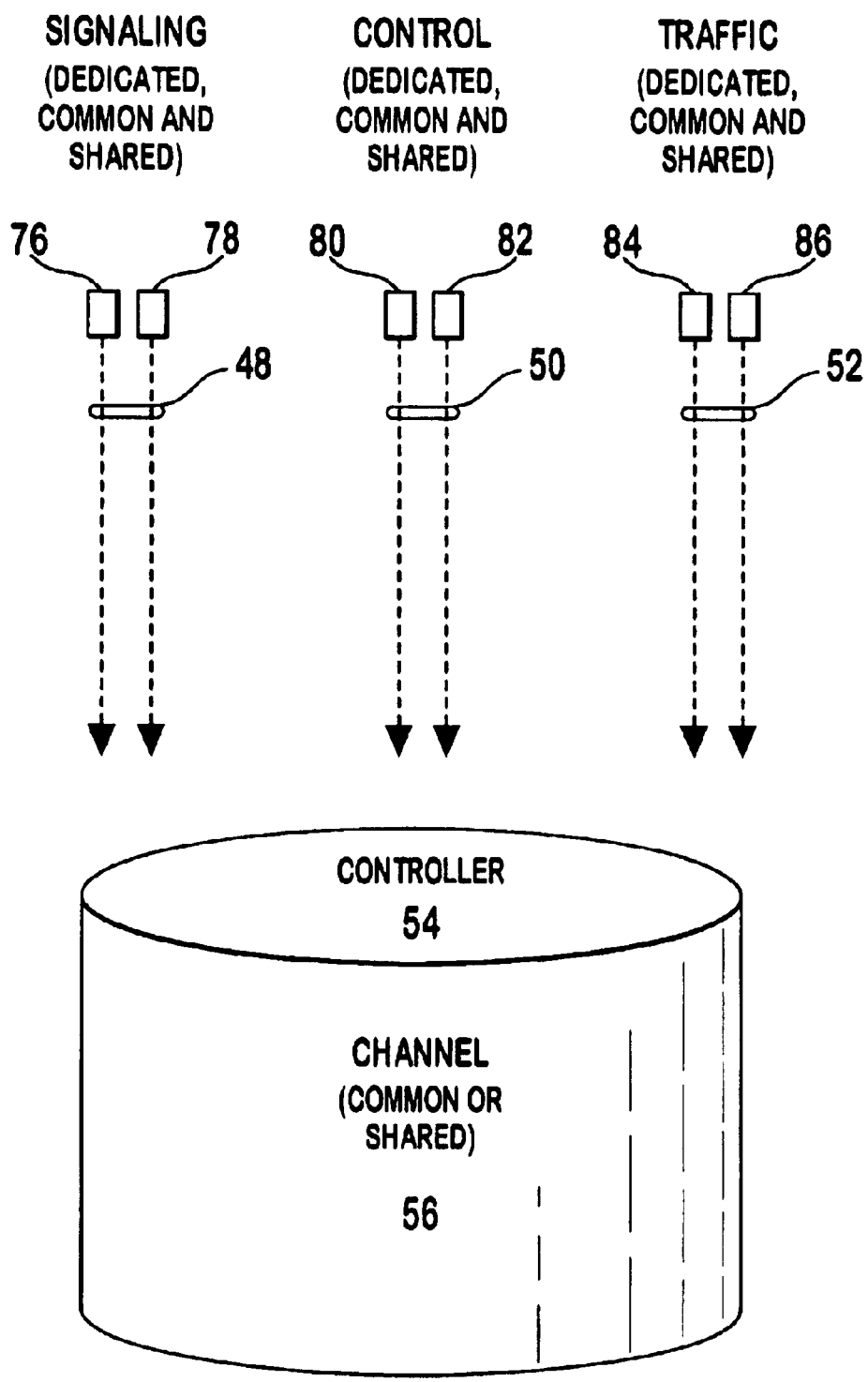
FIG. 7 depicts data source windows used with a common or shared channel.

To prevent the monopolization of the common or shared channel 56 by one data source 48–52 variable windows 76–86 may be used as shown in FIG. 7. Each data source 48–52 has a window or multiple windows 76–86 of outstanding data in the queue that it is permitted. The size of the window 76 is based on the requirements of the specific source. The window 76 is dynamically adjusted in response to the availability of the queue. As the availability of the channel increases, the size of the windows increases which increases the number of outstanding packets. Conversely, as the availability decreases, the size of the windows decreases which decreases the number of outstanding packets. As a result of the decreased windows, the data sources either reroute or stop sending packets to the windows.

What is claimed is:

1. A method of prioritizing packet data for transfer over a multiuser channel in a wireless spread spectrum code division multiple access communication system, the method comprising:

receiving packet data from a plurality of sources at a controller associated with the multiuser channel;

prioritizing each packet of said packet data based on in part reroutability of a class of data types of each said packet where the classes having a non reroutable types of packet take priority over classes with reroutable types of packet; and scheduling each said packet for transmission over the multiuser channel based on in part said prioritization; wherein said prioritization is based on in part a hierarchy of control, signaling and traffic type packets.

2. The method of claim 1 wherein the control packets take priority over the signaling packets which take priority over the traffic packets.

3. The method of claim 1 wherein the classes of packet data comprise a control class with no reroutability, a signaling class with some reroutability and a traffic class with all reroutability.

4. The method of claim 3 wherein each class having a subhierarchy based on a number of users associated with the packet.

5. The method of claim 4 wherein the subhierarchy comprises common and shared packets having priority over dedicated packets.

6. The method of claim 1 wherein the multiuser channel is a shared channel.

7. The method of claim 1 wherein the multiuser channel is a common channel.

8. The method of claim 7 wherein the common channel is a forward access control channel.

9. The method of claim 8 wherein the packets are prioritized into a highest, high medium or lowest priority; wherein the highest priority having downlink shared channel control, uplink shared channel control and shared hybrid automatic repeat request control packets, the high priority having dedicated hybrid automatic repeat request control packets, the medium priority having common control channel and dedicated control channel packets and the lowest priority having dedicated traffic channel packets.

10. A method of prioritizing packet data for transfer over a multiuser channel in a wireless spread spectrum code division multiple access communication system, the method comprising:

receiving packet data from a plurality of sources at a controller associated with the multiuser channel;

prioritizing each packet of said packet data based on in part reroutability of a class of data types of each said packet where the classes having a non reroutable types of packet take priority over classes with reroutable types of packet; and scheduling each said packet for transmission over the multiuser channel based on in part said prioritization; wherein the prioritization is based on in part a hierarchy of common, shared and dedicated type packets.

11. The method of claim 10 wherein the common and shared packets take priority over the dedicated packets.

* * * * *

UNITED STATES PATENT AND TRADEMARK OFFICE
CERTIFICATE OF CORRECTION

PATENT NO. : 6,738,368 B1
DATED : May 18, 2004
INVENTOR(S) : Stephan E. Terry

It is certified that error appears in the above-identified patent and that said Letters Patent is hereby corrected as shown below:

Title page,
Item [56], References Cited, "Chao, H.J. et al." reference, delete "Conferenc" and insert therefor -- Conference --.
"Liebeherr, J. et al." reference, after the word "on", delete "Selecte" and insert therefor -- Selected --.

Column 1,
Line 42, after the first instance of "58", insert -- , as shown in Fig. 3 --.
Line 46, after "58", delete "carriers" and insert therefor -- carries --.

Column 2,
Line 11, after the word "congestion", delete "According" and insert therefor -- Accordingly --.

Column 4,
Line 59, after the word "highest", delete "high medium" and insert therefor -- high, medium --.

Signed and Sealed this

Ninth Day of November, 2004

JON W. DUDAS
*Director of the United States Patent and Trademark Office*